(12) United States Patent
Sutz et al.

(10) Patent No.: US 10,066,597 B2
(45) Date of Patent: Sep. 4, 2018

(54) MULTIPLE-BLADE WIND MACHINE WITH SHROUDED ROTORS

(71) Applicant: Thunderbird Power Corp, Queen Creek, AZ (US)

(72) Inventors: Richard K. Sutz, Scottsdale, AZ (US); Peter E. Jenkins, Denver, CO (US)

(73) Assignee: THUNDERBIRD POWER CORP, Queen Creek, AZ (US)

( * ) Notice: Subject to any disclaimer, the term of this patent is extended or adjusted under 35 U.S.C. 154(b) by 0 days.

(21) Appl. No.: 15/828,045

(22) Filed: Nov. 30, 2017

(65) Prior Publication Data

US 2018/0163695 A1 Jun. 14, 2018

Related U.S. Application Data

(60) Provisional application No. 62/433,982, filed on Dec. 14, 2016.

(51) Int. Cl.
| | | |
|---|---|---|
| F03D 1/04 | (2006.01) | |
| F03D 1/02 | (2006.01) | |
| F03D 7/02 | (2006.01) | |

(52) U.S. Cl.
CPC .............. F03D 1/04 (2013.01); F03D 1/025 (2013.01); F03D 7/0204 (2013.01); F05B 2240/2211 (2013.01); F05B 2240/33 (2013.01)

(58) Field of Classification Search
CPC ........ Y02E 10/725; Y02E 10/72; Y02E 10/74
USPC ..................................................... 290/44, 55
See application file for complete search history.

(56) References Cited

U.S. PATENT DOCUMENTS

| | | | | |
|---|---|---|---|---|
| 508,009 | A * | 11/1893 | George .................... | B63H 5/10 416/124 |
| 556,914 | A * | 3/1896 | Bramwell ............. | F03D 7/0212 416/12 |
| 1,780,431 | A * | 11/1930 | McCarroll .............. | B64C 11/34 416/155 |
| 3,827,482 | A * | 8/1974 | Pope ..................... | F04D 29/384 123/41.49 |
| 3,974,396 | A * | 8/1976 | Schonball ............... | F03D 1/025 290/54 |
| 4,006,925 | A * | 2/1977 | Scherer ................. | F03D 7/0224 200/80 R |
| 4,065,225 | A * | 12/1977 | Allison ................... | F03D 1/025 416/11 |
| 4,080,100 | A | 3/1978 | McNeese | |
| 4,330,714 | A * | 5/1982 | Smith ................... | F03D 1/0608 290/55 |
| 4,370,095 | A * | 1/1983 | Sleeper, Jr. ............. | F03D 80/00 415/914 |

(Continued)

FOREIGN PATENT DOCUMENTS

| | | |
|---|---|---|
| DE | 102011082987 A1 | 3/2013 |
| DE | 102011082987 A1 | 10/2013 |

*Primary Examiner* — Julio C. Gonzalez
*Assistant Examiner* — Charles Reid, Jr.
(74) *Attorney, Agent, or Firm* — Hartman Titus PLC; John D. Titus

(57) ABSTRACT

A horizontal-shaft wind machine having improved low wind speed performance and greater overall efficiency consists of multiple rotors, wherein each successive rotor is larger in diameter than the previous rotor moving from the most windward rotor to the most leeward rotor. Each rotor may be coupled to a shroud/diffuser that is displaced axially downwind from the rotor.

3 Claims, 2 Drawing Sheets

(56) References Cited

U.S. PATENT DOCUMENTS

| | | | | |
|---|---|---|---|---|
| 4,427,342 A * | 1/1984 | Sutz | ........................ | F03D 15/10 416/170 R |
| 4,533,297 A * | 8/1985 | Bassett | ................. | F03D 1/0658 416/11 |
| 5,474,425 A * | 12/1995 | Lawlor | ................... | F03D 1/065 416/223 R |
| 5,506,453 A * | 4/1996 | McCombs | .............. | F03D 1/025 290/44 |
| 6,039,533 A * | 3/2000 | McCabe | ................. | F01D 5/141 415/146 |
| 6,452,287 B1 * | 9/2002 | Looker | ..................... | F03D 1/04 290/44 |
| 7,044,713 B2 * | 5/2006 | Joo | ........................... | F03D 1/02 290/55 |
| 7,074,011 B1 * | 7/2006 | Wobben | ................... | F03D 1/025 290/55 |
| 7,252,478 B2 * | 8/2007 | Aynsley | ................ | F03B 17/063 416/204 R |
| 7,267,530 B2 * | 9/2007 | McCabe | ................... | F03D 1/00 180/7.4 |
| 7,384,239 B2 * | 6/2008 | Wacinski | ................ | F03D 1/025 415/123 |
| 7,484,925 B2 * | 2/2009 | Carlson | ................. | F04D 29/661 415/119 |
| 7,931,444 B2 * | 4/2011 | Godsk | ....................... | F03D 1/06 416/228 |
| 8,033,372 B2 * | 10/2011 | Chiesa | .................... | F16D 41/12 192/46 |
| 8,109,727 B2 * | 2/2012 | Barber | ................. | F03D 1/0666 416/132 B |
| 8,258,645 B2 * | 9/2012 | Barber | ................. | F03D 1/0608 290/55 |
| 8,317,469 B2 * | 11/2012 | Kinzie | ...................... | F03D 1/04 415/211.2 |
| 8,373,298 B2 * | 2/2013 | Barber | ................. | F03D 1/0608 290/44 |
| 8,753,080 B2 * | 6/2014 | Morimoto | ............. | F03D 1/0658 416/1 |
| 8,777,557 B2 * | 7/2014 | Zhang | ..................... | F03D 1/025 415/123 |
| 8,998,588 B2 * | 4/2015 | Bharadwaj | ............... | H02K 9/06 415/206 |
| 2005/0214119 A1 * | 9/2005 | Miller | .................... | F03D 1/025 416/126 |
| 2006/0239821 A1 * | 10/2006 | McCabe | ................... | F03D 1/025 416/197 A |
| 2008/0061559 A1 * | 3/2008 | Hirshberg | ............. | F03D 3/0454 290/55 |
| 2009/0224555 A1 * | 9/2009 | Zhencai | ................. | F03D 1/025 290/55 |
| 2009/0263244 A1 * | 10/2009 | Presz, Jr. | .................. | F03D 1/04 416/1 |
| 2010/0068052 A1 * | 3/2010 | Werle | ........................ | F03D 1/04 415/220 |
| 2010/0215502 A1 * | 8/2010 | Harrison | ................. | F03D 1/025 416/205 |
| 2010/0225190 A1 * | 9/2010 | Huang | ..................... | F03D 1/02 310/115 |
| 2011/0002781 A1 * | 1/2011 | Presz, Jr. | .................. | F03D 1/04 415/211.2 |
| 2011/0008164 A1 * | 1/2011 | Presz, Jr. | .................. | F03D 1/04 415/211.2 |
| 2011/0014038 A1 * | 1/2011 | Werle | ........................ | F03D 1/04 415/200 |
| 2011/0020107 A1 * | 1/2011 | Presz, Jr. | .................. | F03D 1/04 415/4.1 |
| 2011/0156403 A1 * | 6/2011 | Choi | ........................ | F03D 1/025 290/55 |
| 2013/0266439 A1 * | 10/2013 | Rubak | ....................... | F01D 1/04 415/208.1 |
| 2013/0315732 A1 * | 11/2013 | Sutz | ........................ | F03D 1/025 416/9 |
| 2013/0334822 A1 | 12/2013 | Urch | | |
| 2014/0044535 A1 | 2/2014 | Wood | | |
| 2014/0169937 A1 * | 6/2014 | Gysling | .................... | F03D 1/04 415/1 |
| 2014/0361543 A1 * | 12/2014 | Miro | ....................... | F03D 9/002 290/55 |
| 2015/0300183 A1 * | 10/2015 | Dumlupinar | ............ | F01D 5/021 415/1 |

* cited by examiner

MULTIPLE-BLADE WIND MACHINE WITH SHROUDED ROTORS

BACKGROUND OF THE INVENTION

This invention relates generally to wind machines, and in particular to so-called horizontal-shaft wind machines.

A wind machine is a device for extracting energy from the wind. A typical horizontal axis wind machine consists of a horizontally pivoting platform to the top of a mast. A rotor assembly consisting of a plurality of sails or blades is attached to a horizontal shaft, which is supported for rotation on top of the platform. The horizontal shaft is joined to a power transmission system which is coupled to a work-performing device, for example an electrical generator or pushrod for pumping water. Wind machines can generally be divided into two categories: Lift-type and drag-type. Lift-type wind machines use slender airfoils similar to airplane propellers, which create lift as the wind passes over the airfoils to rotate the wind machine rotor assembly. As with aircraft propellers, the pitch of the lift-type airfoils must be matched to the windspeed for maximum efficiency and the pitch typically varies from the root of the airfoil to the tip in order to compensate for the different path velocity of the airfoil along the leading edge. Drag-type wind machines use relatively wide sails with large surface areas, which act to slow the wind striking the sails and convert a portion of the kinetic energy of the wind into rotary motion of the wind machine rotor. Drag-type wind machines typically include a rudder that extends from the rear of the wind machine head for aligning the wind machine so that the rotor always faces the wind.

Conventional wind machines, be they lift-type or drag-type typically comprise a single set of blades or a single rotor rotating about a horizontal shaft. Mathematically, the aerodynamic efficiency yielded by a single set of blades or by a single rotor cannot exceed 59.6% (See Betz, A. "Wind-Energie and Ihre Ausnutzun durch Windmuelen," van den Hoeck & Ruprech, Goettingen, 1926). In practice, the output of typical wind machines is substantially below 59.6%.

Various apparatus have been proposed to increase the efficiency of wind machines including use of multiple rotors and/or a shroud, which increases the effective swept area of the rotors and, therefore, the overall efficiency of the system.

U.S. Pat. No. 6,452,287 discloses a horizontal axis wind machine in which a single rotor is surrounded by a shroud that is supported by the mast with the shroud in a position forward of the rotor. Close clearance between the shroud and the tips of the rotors reduces the generation of rotor tip vortices and the concomitant loss of efficiency. A commercially available wind machine known as the Wind Tamer™ from Arista Power, Inc. incorporates single rotor with a large diffuser supported by the mast with the diffuser/shroud behind the rotor. Another commercially available wind machine from Ogin, Inc. known as the Flo Design Wind Turbine incorporates a single rotor with a lobed nozzle extending in front of the rotor and a separate diffuser that is spaced radially apart from and offset to the rear of the nozzle. Both the nozzle and the diffuser are supported by the mast. None of the prior art, however, discloses or suggests a shrouded rotor in which the shroud is attached to the rotor shaft, or otherwise rotates with the rotor as it spins and none of the prior art discloses or suggests a multiple-rotor wind machine with multiple individual shrouds.

SUMMARY OF THE INVENTION

The present invention comprises a horizontal wind machine having improved low-wind operability. According to one embodiment of the present invention, the wind machine comprises a wind-driven rotor which is mounted to a horizontally extending rotating shaft. The rotor comprises a plurality of sails, which are supported by a plurality of wheel arms extending radially outward from the rotor hub. A shroud or diffuser is mounted to the horizontal shaft so that it rotates with the rotor. The diffuser is mounted to the shaft either by mounting it directly to the radial ends of the wheel arms, or by providing a separate support structure attached to the rotor hub behind the rotor. Preferably, the diffuser is displaced axially rearward of the trailing edge of the rotor so that there is a gap between the trailing edges of the rotor sails and the leading edge of the diffuser. The gap between the rotor and diffuser enables the wind machine to capture energy from the wind that otherwise would be lost through side flow.

In another embodiment, the wind machine comprises multiple rotors including a first rotor coupled to a first shaft and a second rotor coupled to a second shaft, wherein the second shaft is coaxial with the first shaft. The second shaft is coupled to the first shaft via an overrunning clutch mechanism, such as a ratchet and pawl, which allows the second shaft to transmit torque to the first shaft if the second shaft would otherwise rotate faster than the first shaft. The coupled rotors produce more torque than a conventional wind machine having only one rotor sail assembly of equal outer diameter. Three or more rotors are also contemplated.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
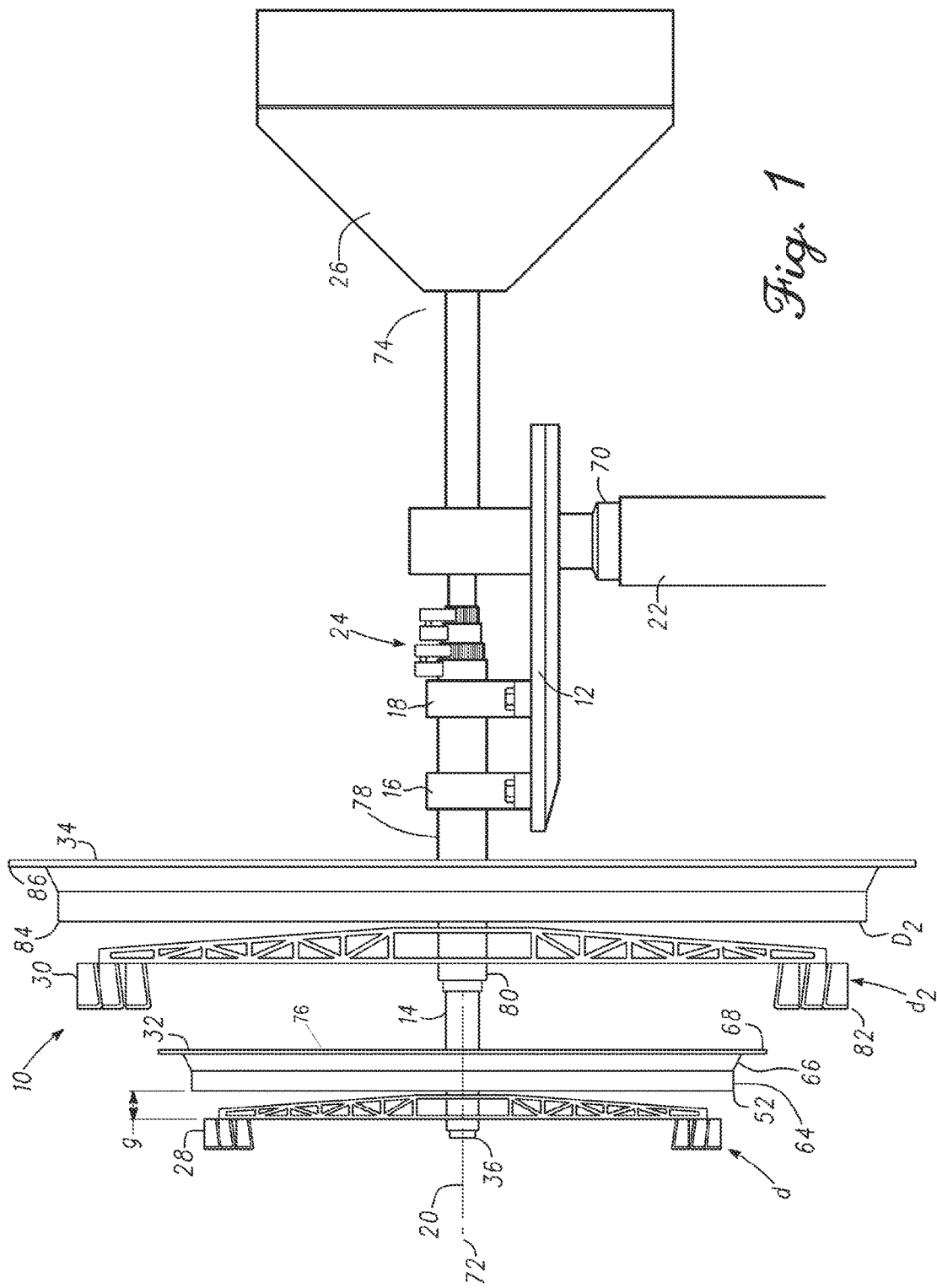
FIG. 1 is a side-view of a multiple-rotor wind machine incorporating features of the present invention.

The drawing figures are intended to illustrate the general manner of construction and are not necessarily to scale. In the detailed description and in the drawing figures specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
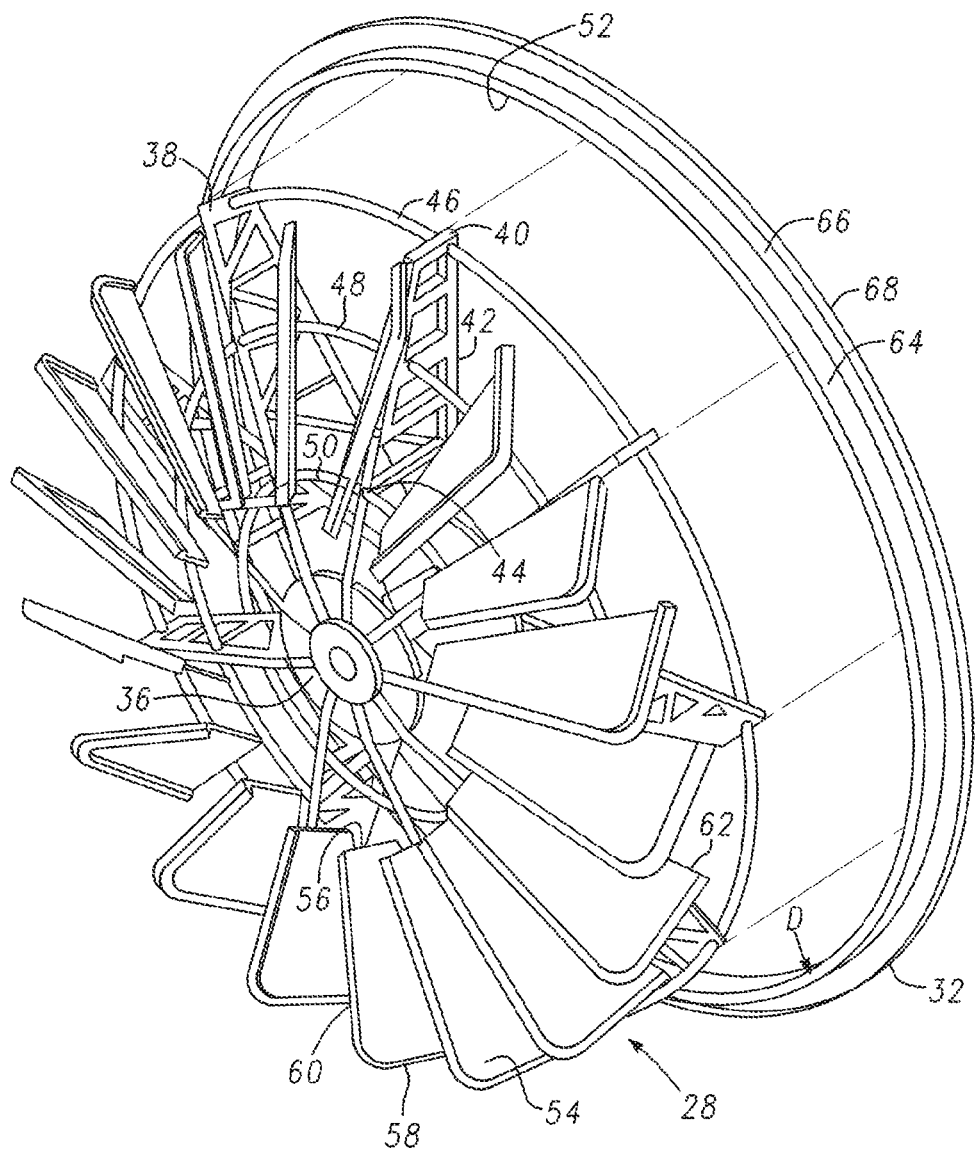
FIG. 2 is an exploded front-perspective view of a wind machine rotor and diffuser assembly incorporating features of the present invention.

With reference to FIGS. 1-2, a horizontal wind machine 10 incorporating features of the present invention comprises a horizontal rotor shaft 14 mounted to a platform 12 by means of a pair of bearing blocks 16 and 18, which allow horizontal shaft 14 to rotate freely about a horizontal axis 20. Power from horizontal shaft 14 is coupled to a vertical shaft housed within vertical support column 22 by means of a transmission 24 which can be any conventional transmission or can be the inventive transmission described in detail in co-pending application Ser. No. 13/479,773 the specification of which is incorporated herein by reference. Platform 12 is attached to the vertical support column 22 by a thrust bearing 70, which enables platform 12 to be pivoted horizontally so that the rotational axis 20 of shaft 14 can be aligned with the wind direction so that axis 20 has an upwind end 72 and a downwind end 74. Wind machine 10 further comprises a tail section or rudder 26, which aligns the platform 12 so that rotors 28 and 30 as well as the shrouds 32 and 34, which act as diffusers as described more fully hereinafter, all face into the wind. Alternatively, platform 12 may be aligned with the wind by means of stepper motors or other active controls.

With particular reference to FIG. 2, rotor 28 comprises a hub 36 attached to horizontal shaft 14. A plurality of wheel arms 38 are attached to and extend radially outward from hub 36. Wheel arms 38 may be of any construction but in the illustrative embodiments are open trusses composed of a lightweight metal such as aluminum to minimize weight. Other lightweight materials such as carbon fiber or other composites are also contemplated. Wheel arms 38 are supported at the outer ends 40 as well as at an intermediate point 42 and an inward point 44 by a plurality of circular support bands 46, 48 and 50.

A plurality of sails 54 are mounted to wheel arms 38 and/or support bands 46, 48 and 50 so as to extend in a windward (72) direction forward of wheel arms 38. Sails 54 are attached substantially equidistant from shaft 14 to create a substantially rotationally balanced circular rotor having an outer diameter (d). Each of the plurality of sails 54 has a root 56, a tip 58, a leading edge 60, and a trailing edge 62. Sails 54 may be of any conventional construction, for example fabric, sheet metal, or ultraviolet-resistant plastic, but in the illustrative embodiment are formed of galvanized steel sheet.

In addition to providing support for wheel arms 38, support band 46 provides a mounting point for shroud 32 which is mounted to wheel arms 38. Shroud 32 comprises a generally cylindrical section 64 having an inside diameter (D) a tapered conical section 66 and a brim 68 which cooperate to act as a diffuser to form a low-pressure region immediately behind rotor 28. Shroud 32 is supported so that the leading-edge 52 of shroud 32 is displaced in a downwind (76) direction relative to the trailing edges 62 of sails 54 so that there is a gap "g" between the leading-edge 52 of shroud 32 and the trailing edges 56 of sails 54. The gap "g" may be optimized for various wind conditions to maximize the energy captured by rotor 30, which would otherwise be lost due to side flow. As shown in FIG. 1, additional rotors of progressively larger size, such as rotor 30 may be disposed downwind of rotor 28. Rotor 30 and shroud 34 are of similar construction to rotor 28 and shroud 32 and therefore will not be discussed in detail herein other than to observe that rotor 30 has a hub 80 attached to a second shaft 78, a plurality of sails 82, having an outer diameter (d2) and that shroud 34 comprises a substantially annular body having an upwind leading edge 84, a downwind trailing edge 86, and an inside diameter ($D_2$) Additional rotors and shrouds of progressively smaller size (not shown) may also be disposed windward of rotor 28 and/or additional rotors and shrouds of progressively larger size may be disposed downwind of rotor 30.

Although certain illustrative embodiments and methods have been disclosed herein, it will be apparent from the foregoing disclosure to those skilled in the art that variations and modifications of such embodiments and methods may be made without departing from the invention. For example, although the illustrative embodiment of FIGS. 1-2 contemplates two rotors with shrouds and two shafts all rotating in the same direction, three rotors with shrouds and three shafts rotating in the same directions, or greater than three rotors with shrouds and three shafts rotating in the same or different directions are contemplated as being within the scope of the invention. Similarly, although in the illustrative embodiments shroud 32 is attached directly to wheel arms 38, in an alternative embodiment, shroud 32 is supported directly to horizontal shaft 14 by a separate support structure, which causes shroud 32 to rotate in unison with rotor 28.

Wind machine 10 may be used for AC or DC electric power generation, pumping water, or any other task performed by wind machines and therefore the invention is not intended to be limited to the manner in which the power is transmitted to the ultimate load. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. A wind machine (10) adapted to extract work from the wind comprising:
   a first rotor shaft (14) having a substantially horizontal axis of rotation;
   a bearing support (70) capable of aligning the axis of rotation (20) of the first rotor shaft (14) with the wind direction whereby the first rotor shaft has an upwind end (72) and a downwind end (74);
   a first rotor assembly (28) rotatable about the first rotor shaft, the first rotor assembly comprising a hub (36) attached to the upwind end (72) of the first rotor shaft (14), the rotor assembly (28) further comprising a first plurality of sails (54) attached to the hub (36), the first plurality of sails extending substantially radially outward substantially equidistant from the hub (36) to define an outer diameter (d) of the rotor assembly (28); the first rotor assembly having an upwind face and a downwind face; and
   a first shroud (32) comprising a substantially annular body having an upwind leading edge (52), a downwind trailing edge (76) and an inside diameter (D), the inside diameter (D) of the first shroud (32) having a dimension that is larger than the outer diameter (d) of the first rotor assembly (28), the first shroud being mounted for rotation with the first rotor shaft (14), the upwind leading edge of the first shroud being offset axially downwind from the downwind face of the first rotor assembly, whereby an axial and radial gap is formed between the first rotor assembly and the first shroud.

2. The wind machine of claim 1, further comprising
   a second rotor shaft (78) mounted for rotation coaxially with the first rotor shaft (14), the second rotor shaft having an upwind end (72) and a downwind end (74);
   a second rotor assembly (30) attached to the second rotor shaft (78), the second rotor assembly (30) comprising a second (80) attached to the upwind end (72) of the second rotor shaft (78), the second rotor assembly (30) further comprising a second plurality of sails (82) attached to the second hub (80), the second plurality of sails (82) extending substantially radially outward substantially equidistant from the hub to define an outer diameter ($d_2$) of the second rotor assembly (30), the second rotor assembly having an upwind face and a downwind face; and a second shroud (34) comprising a substantially annular body having an upwind leading edge (84), a downwind trailing edge (86) and an inside diameter ($D_2$), the inside diameter ($D_2$) of the second shroud having a dimension that is larger than the outer diameter ($d_2$) of the second rotor assembly, the second shroud (32) being mounted for rotation with the second rotor shaft, the upwind leading edge of the second shroud being offset axially downwind from the downwind face of the second rotor assembly, whereby an axial and radial gap is formed between the second rotor assembly and the second shroud.

3. The wind machine of claim 2, wherein:

the outer diameter of the second rotor assembly ($d_2$) is larger than the outer diameter (d) of the first rotor assembly; and the second rotor assembly (30) is displaced axially downwind from the first rotor assembly (28).

\* \* \* \* \*